United States Patent
Kawasaki et al.

(10) Patent No.: US 10,644,347 B2
(45) Date of Patent: May 5, 2020

(54) NEGATIVE ELECTRODE ACTIVE MATERIAL AND LITHIUM ION SECONDARY BATTERY USING THE SAME

(71) Applicant: NEC Corporation, Tokyo (JP)

(72) Inventors: Daisuke Kawasaki, Tokyo (JP); Takashi Ohtsuka, Tokyo (JP); Suguru Tamai, Tokyo (JP); Noboru Yoshida, Tokyo (JP); Shinya Sudo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/079,676

(22) PCT Filed: Feb. 22, 2017

(86) PCT No.: PCT/JP2017/006657
§ 371 (c)(1),
(2) Date: Aug. 24, 2018

(87) PCT Pub. No.: WO2017/150311
PCT Pub. Date: Sep. 8, 2017

(65) Prior Publication Data
US 2019/0051928 A1    Feb. 14, 2019

(30) Foreign Application Priority Data

Feb. 29, 2016   (JP) .................................. 2016-036538
Oct. 17, 2016   (JP) .................................. 2016-203416

(51) Int. Cl.
*H01M 10/058* (2010.01)
*H01M 10/0525* (2010.01)
(Continued)

(52) U.S. Cl.
CPC ....... *H01M 10/0525* (2013.01); *H01M 4/133* (2013.01); *H01M 4/134* (2013.01);
(Continued)

(58) Field of Classification Search
CPC ......... H01M 10/0525; H01M 10/0566; H01M 10/058; H01M 4/38; H01M 4/583;
(Continued)

(56) References Cited

U.S. PATENT DOCUMENTS

| 2004/0248011 A1* | 12/2004 | Asao | H01M 4/134 |
| | | | 429/231.95 |
| 2006/0166098 A1* | 7/2006 | Tabuchi | H01M 4/134 |
| | | | 429/232 |

(Continued)

FOREIGN PATENT DOCUMENTS

| JP | A-2003-123740 | 4/2003 |
| JP | A-2004-139886 | 5/2004 |

(Continued)

OTHER PUBLICATIONS

JP2008027897MT (Year: 2008).*
International Search Report dated Apr. 25, 2017, in corresponding PCT International Application.

*Primary Examiner* — Alexander Usyatinsky
(74) *Attorney, Agent, or Firm* — Finnegan, Henderson, Farabow, Garrett & Dunner, L.L.P.

(57) ABSTRACT

A negative electrode active material constituting a lithium ion secondary battery having high energy density and excellent cycle characteristics, and a negative electrode and a lithium ion secondary battery comprising the same are provided. The present invention relates to a negative electrode active material comprising graphite particles and crystalline silicon particles, wherein a median diameter of the crystalline silicon particles is 0.7 μm or less, and a weight ratio of the crystalline silicon particles to the total weight of the graphite particles and the crystalline silicon particles is 1 wt % or more and 25 wt % or less.

11 Claims, 4 Drawing Sheets

(51) Int. Cl.
  *H01M 4/133* (2010.01)
  *H01M 4/587* (2010.01)
  *H01M 4/134* (2010.01)
  *H01M 4/36* (2006.01)
  *H01M 10/0566* (2010.01)
  *H01M 4/38* (2006.01)
  *H01M 4/583* (2010.01)
  *H01M 4/62* (2006.01)
  *H01M 10/052* (2010.01)
  *H01M 10/0585* (2010.01)
  *H01M 4/02* (2006.01)

(52) U.S. Cl.
  CPC ........... *H01M 4/364* (2013.01); *H01M 4/386* (2013.01); *H01M 4/583* (2013.01); *H01M 4/587* (2013.01); *H01M 4/622* (2013.01); *H01M 10/058* (2013.01); *H01M 10/0566* (2013.01); *H01M 10/052* (2013.01); *H01M 10/0585* (2013.01); *H01M 2004/021* (2013.01); *H01M 2004/027* (2013.01); *H01M 2220/20* (2013.01); *Y02E 60/122* (2013.01); *Y02T 10/7011* (2013.01)

(58) Field of Classification Search
  CPC ........ H01M 4/62; H01M 4/622; H01M 4/386; H01M 4/133; H01M 4/134; H01M 4/36; H01M 4/587; H01M 10/052; H01M 2004/021; H01M 2004/027; H01M 2220/20; Y02T 10/7011; Y02E 60/122
  See application file for complete search history.

(56) References Cited

U.S. PATENT DOCUMENTS

| | | | | |
|---|---|---|---|---|
| 2008/0124631 | A1* | 5/2008 | Fukui | H01M 4/0404 429/217 |
| 2009/0162750 | A1* | 6/2009 | Kawakami | H01G 11/46 429/218.1 |
| 2009/0239151 | A1* | 9/2009 | Nakanishi | H01M 4/0428 429/231.95 |
| 2011/0311873 | A1* | 12/2011 | Schulz | H01M 4/0416 429/231.8 |
| 2013/0069601 | A1* | 3/2013 | Coowar | H01M 4/134 320/162 |
| 2013/0108923 | A1* | 5/2013 | Nakanishi | B82Y 30/00 429/217 |
| 2015/0064555 | A1* | 3/2015 | Inoue | H01M 4/134 429/217 |
| 2015/0303456 | A1* | 10/2015 | Yoo | H01M 4/364 429/217 |

FOREIGN PATENT DOCUMENTS

| | | | |
|---|---|---|---|
| JP | A-2004-185984 | | 7/2004 |
| JP | A-2004-362789 | | 12/2004 |
| JP | 2008027897 | * | 2/2008 |
| JP | A-2008-027897 | | 2/2008 |
| JP | A-2010-092830 | | 4/2010 |
| JP | A-2015-035317 | | 2/2015 |
| JP | A-2015-079621 | | 4/2015 |
| WO | WO 2013/151047 A1 | | 10/2013 |
| WO | WO 2015/098050 A1 | | 7/2015 |

* cited by examiner

NEGATIVE ELECTRODE ACTIVE MATERIAL AND LITHIUM ION SECONDARY BATTERY USING THE SAME

CROSS-REFERENCE TO RELATED PATENT APPLICATIONS

This application is a National Stage Entry of International Application No. PCT/JP2017/006657, filed Feb. 22, 2017, which claims priority from Japanese Patent Application No. 2016-036538, filed Feb. 29, 2016 and Japanese Patent Application No. 2016-203416, filed Oct. 17, 2016. The entire contents of the above-referenced applications are expressly incorporated herein by reference.

TECHNICAL FIELD

The present invention relates to a negative electrode active material, and a negative electrode and a lithium ion secondary battery comprising the same.

BACKGROUND ART

Lithium ion secondary batteries have advantages such as high energy density, low self-discharge, excellent long-term reliability and the like, and therefore they have been put into practical use in notebook-type personal computers, mobile phones and the like. Furthermore, in recent years, in addition to high functionality of electronic devices, by expansion of the market for motor-driven vehicles such as electric vehicles and hybrid vehicles, and acceleration of development of home and industrial power storage systems, development of a high performance lithium ion secondary battery which is excellent in battery characteristics such as cycle characteristics and storage characteristics and further improved in capacity and energy density is demanded.

As a negative electrode active material providing a high capacity lithium ion secondary battery, metal-based active materials such as silicon, tin, alloys thereof, and metal oxides thereof have attracted attention. For example, Patent Document 1 describes a lithium ion secondary battery comprising a negative electrode containing amorphous silicon and graphite particles. Patent Document 2 describes a secondary battery having a negative electrode comprising a negative electrode active material containing silicon or the like and graphite, and specifically describes a secondary battery comprising crystalline Si particles having an average particle size of 5 μm and graphite particles having an average particle diameter of 10 μm is disclosed. Patent Document 3 discloses an active material layer comprising carbon material particles capable of absorbing and desorbing lithium ions, metal particles capable of alloying with lithium such as silicon, and oxide particles capable of absorbing and desorbing lithium ions.

CITATION LIST

Patent Document

Patent Document 1: Japanese Patent Laid-Open Publication No. 2004-185984
Patent Document 2: Japanese Patent Laid-Open Publication No. 2004-362789
Patent Document 3: Japanese Patent Laid-Open Publication No. 2003-123740

SUMMARY OF INVENTION

Technical Problem

However, when amorphous silicon and lithium are alloyed as in Patent Document 1, the crystalline phase of the lithium-silicon alloy easily becomes a non-uniform phase or an turbostratic phase, as compared with the case of alloying crystalline silicon and lithium. As a result, there had been a problem that deviations occur in the negative electrode potential and the correlation between the state of charge of the cell and the potential of the cell is degraded. In Patent Documents 2 and 3, studies on the particle size of silicon particles and mixing conditions with graphite particles are insufficient, and thus there had been room for further improvement.

Accordingly, an object of the present invention is to provide a negative electrode active material constituting a lithium ion secondary battery having high energy density and excellent cycle characteristics, a negative electrode comprising the negative electrode active material, and a lithium ion secondary battery comprising the negative electrode.

Solution to Problem

The present invention relates to the following items.
A negative electrode active material comprising graphite particles and crystalline silicon particles, wherein
a median diameter of the crystalline silicon particles is 0.7 μm or less, and
a weight ratio of the crystalline silicon particles to the total weight of the graphite particles and the crystalline silicon particles is 1 wt % or more and 25 wt % or less.

Advantageous Effect of Invention

According to the present invention, a lithium ion secondary battery having high energy density and excellent cycle characteristics can be provided.

DESCRIPTION OF EMBODIMENTS

Details of the negative electrode active material, the negative electrode, and the lithium ion secondary battery comprising these according to the present embodiment will be described for each constituting member.

[Negative Electrode]

The negative electrode may have a structure in which a negative electrode active material layer comprising a negative electrode active material is formed on a current collector. The negative electrode of the present embodiment has, for example, a negative electrode current collector formed of a metal foil and a negative electrode active material layer formed on one surface or both surfaces of the negative electrode current collector. The negative electrode active material layer is formed so as to cover the negative electrode current collector with the negative electrode binder. The negative electrode current collector is arranged to have an extended portion connected to a negative electrode terminal, and the negative electrode active material layer is not formed on this extended portion. The negative electrode active material is a material capable of absorbing and desorbing lithium. In the present specification, materials that do not intrinsically absorb and desorb lithium, such as most of binders, are not included in the negative electrode active material. For example, when polyimide is used as a binder, absorption and desorption of lithium is confirmed several times from the initial state, but polyimide is not included in the negative electrode active material in the present specification.

(Negative Electrode Active Material)

The negative electrode active material of the present embodiment comprises graphite particles and crystalline silicon particles having a median diameter (also referred to as "D50") of 0.7 μm or less, and a weight ratio of the crystalline silicon particles to the total weight of the graphite particles and the crystalline silicon particles is 1 wt % or more and 25 wt % or less. When the negative electrode active material of the present embodiment is used, a lithium ion secondary battery having high energy density and excellent cycle characteristics can be obtained.

In the present embodiment, the negative electrode active material comprises crystalline silicon. The fact that silicon is crystalline can be confirmed by powder XRD analysis. Even when silicon particles are present in the electrode, not in a powder state, crystallinity can be confirmed by electron beam diffraction analysis by irradiating an electron beam.

When the crystallinity of the silicon particles is high, the active material capacity and charge and discharge efficiency tend to be increased. On the other hand, if the crystallinity is low, the cycle characteristics of the lithium ion battery tend to be improved. However, the amorphous state may generate a plurality of crystal phases of the negative electrode in the charged state in some cases, and thus deviations in the negative electrode potential become large. Crystallinity may be evaluated from calculation by Scherrer equation using FWHM (Full Width Half Maximum). The approximate crystallite size which results in preferable crystallinity is preferably 50 nm or more and 500 nm or less. It is more preferably 70 nm or more and 200 nm or less.

The median diameter of the crystalline silicon in the negative electrode active material is preferably 0.7 μm or less, more preferably 0.6 μm or less, further preferably 0.5 μm or less, particularly preferably 0.3 μm or less. The lower limit of the median diameter of the crystalline silicon is not particularly limited, but it is preferably 0.05 μm or more, more preferably 0.1 μm or more. Here, the explanation about the median diameter of the crystalline silicon and the like is also applied to the median diameter and the like in the case where the crystalline silicon is formed of an alloy of silicon and metal. When the median diameter of the crystalline silicon is 0.7 μm or less, volume expansion and shrinkage of each silicon particle during charge and discharge of the lithium ion secondary battery can be reduced, and deterioration due to non-uniformity such as crystal grain boundaries and defects hardly occurs. As a result, cycle characteristics such as capacity retention ratio of the lithium ion secondary battery are improved. When the median diameter of silicon is too large, grain boundaries and interfaces increase, and thus in addition to the increase of heterogeneous reaction in the particle, segregation of side reaction products and the like are observed more often. In the present invention, the median diameter (D50) is determined based on volume-based particle diameter distribution by laser diffraction/scattering type particle size distribution measurement.

The specific surface area (CS) of the crystalline silicon is preferably 1 $m^2/cm^3$ or more, more preferably 5 $m^2/cm^3$ or more, further preferably 10 $m^2/cm^3$ or more. The specific surface area (CS) of the crystalline silicon is preferably 300 $m^2/cm^3$ or less. Herein, CS (Calculated Specific Surfaces Area) means a specific surface area (unit: $m^2/cm^3$) assuming that particles are spheres.

The silicon having a median diameter of 0.7 μm or less may be prepared by a chemical synthesis method or may be obtained by pulverizing a coarse silicon compound (for example, silicon having the size of about 10 to 100 μm). The pulverization can be carried out by a conventional method, for example, using a conventional pulverizing machine such as a ball mill and a hammer mill or pulverizing means.

The crystalline silicon is at least one selected from the group consisting of elemental silicon and an alloy of silicon and a metal. In the case where the crystalline silicon is an alloy of silicon and a metal, the metal is preferably selected from the group consisting of Li, B, Al, Ti, Pb, Sn, In, Bi, Ag, Ba, Ca, Hg, Pd, Pt, Te, Zn, and La, and it is more preferably selected from the group consisting of Li, B, Ti, and Fe. The content of non-silicon element(s) in the alloy of silicon and a metal is not particularly limited, but for example, 0.1-5 wt % is preferable. Examples of a method of manufacturing an alloy of silicon and a metal include a method of mixing and melting elemental silicon and a metal and a method of coating the surface of elemental silicon with a metal by vapor deposition or the like.

The negative electrode active material further comprises graphite particles. The type of the graphite particles in the negative electrode active material is not particularly limited, but examples thereof may include natural graphite and artificial graphite, and may include two or more types among them. The shape of the graphite particle is not particularly limited, but it may be, for example, spherical, massive, flake-like or the like. Graphite has high electrical conductivity and is excellent in adhesion to a current collector made of metal and in flatness of voltage.

The median diameter (D50) of the graphite particles is not particularly limited, but the lower limit is preferably 1 μm or more, more preferably 3 μm or more, further preferably 5 μm or more, and the upper limit is preferably 20 μm or less, more preferably 15 μm or less. When the median diameter of the graphite particles is within the above range, silicon particles having a small particle diameter are likely to uniformly and evenly adhere to near the surface layer of the graphite particles.

The specific surface area of the graphite is not particularly limited, but, for example, the BET specific surface area is preferably 0.5 to 9 $m^2/g$, more preferably 0.8 to 5 $m^2/g$.

The crystal structure of graphite particles is not particularly limited as long as it is capable of absorbing and desorbing lithium ions. For example, a plane gap d (002) may be preferably about 0.3354 to 0.34 nm, more preferably about 0.3354 to 0.338 nm.

As Raman bands of graphite by Raman spectroscopy of graphite particles, G band (around 1580 to 1600 cm$^{-1}$) corresponding to the in-plane vibration mode and D band (around 1360 cm$^{-1}$) derived from in-plane defects are observed. When these peak intensities respectively represent $I_G$ and $I_D$, a high peak intensity ratio of $I_G/I_D$ means that the degree of graphitization is high. Raman spectroscopic characteristics of the graphite particles used in the present embodiment are not particularly limited, but, for example, it is preferable that $I_G/I_D$ is 2 or more and 11 or less.

With respect to the content of crystalline silicon relative to the total weight of graphite particles and crystalline silicon particles in the negative electrode active material, the lower limit is preferably 1% by weight or more, more preferably 2% by weight or more, further preferably 5% by weight or more, and the upper limit is preferably 25% by weight or less, more preferably 20% by weight or less, further preferably 15% by weight or less, particularly preferably 10% by weight or less. When the content of the crystalline silicon is within the above range, the silicon particles are likely to evenly and uniformly adhere to the surface of the graphite particles, and thereby improving the cycle characteristics such as the capacity retention ratio of the lithium ion secondary battery. When the content of crystalline silicon is too large, agglomeration of silicon easily occurs. Due to the agglomeration, a part of silicons may not contribute to charge and discharge, and the volume change of silicon associated with absorption and desorption of lithium is large, and thereby there may be a problem that cycle characteristics of charge and discharge are deteriorated in some cases. On the other hand, when the content of crystalline silicon is too small, sufficient charge and discharge capacity may not be obtained in some cases.

The total content of the graphite particles and the crystalline silicon particles relative to the total weight of the negative electrode active material is preferably 50% by weight or more, more preferably 70% by weight or more, still more preferably 80% by weight or more, and may be 100% by weight.

When X is the median diameter of the crystalline silicon particles and Y is the median diameter of the graphite in the negative electrode active material, X/Y is preferably 2/100 to 50/100, more preferably about 2/100 to 40/100, further preferably about 2/100 to 30/100. When X/Y is within the above range, the surface of graphite is more easily uniformly covered with crystalline silicons having a small particle size, and the influence of expansion and shrinkage of silicon during charge and discharge of the lithium ion secondary battery is reduced and thereby the cycle characteristics of the lithium ion secondary battery can be improved.

Figure 5:
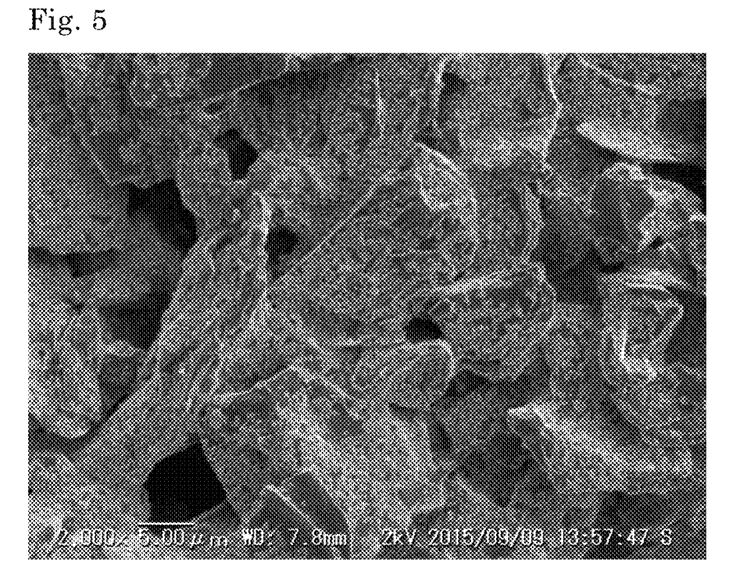
FIG. 5 is a SEM image of the negative electrode produced in Example 22.
Figure 6:
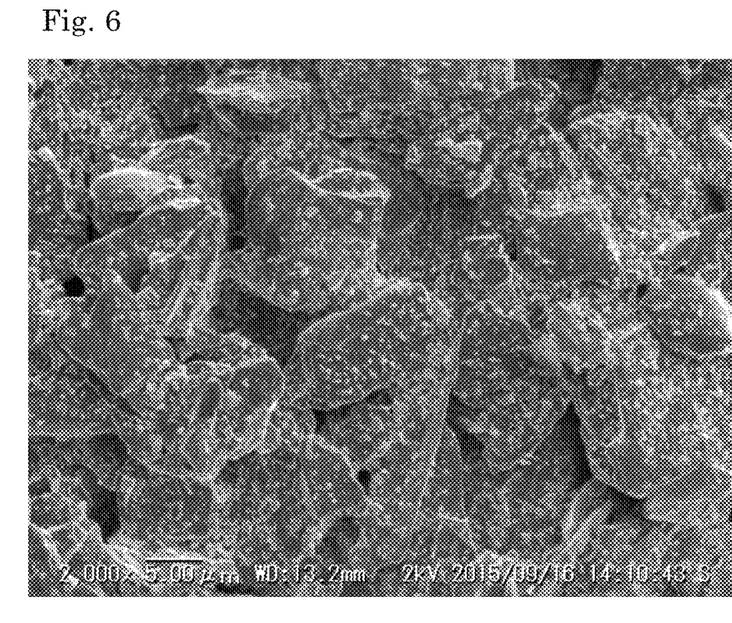
FIG. 6 is a SEM image of the negative electrode produced in Example 21.

As one example of the present embodiment, the SEM images of the negative electrodes are shown in FIG. 5 and FIG. 6 (for details, refer to Examples). As shown in FIG. 5 and FIG. 6, the crystalline silicon in the negative electrode of the present embodiment has a small median diameter of 0.7 μm or less, and by mixing the silicon and graphite at the predetermined weight ratio, the silicon is almost uniformly dispersed and adhered on the surface of the graphite.

As the negative electrode active material, in addition to the above-described crystalline silicon particles having a median diameter of 0.7 μm or less and graphite particles, other negative electrode active materials may be comprised as long as the effect of the present invention can be obtained. Examples of other negative electrode active material include a material comprising silicon as a constituent element (excluding crystalline silicon particles having a median diameter of 0.7 μm or less. Hereinafter, it is also referred to as a silicon material). Examples of the silicon material include an alloy comprising metal silicon (excluding an alloy with crystalline silicon particles having a median diameter of 0.7 μm or less) and a silicon oxide represented by the composition formula $SiO_x$ (0<x≤2). The metal used for the alloy comprising silicon is preferably selected from the group consisting of Li, B, Al, Ti, Pb, Sn, In, Bi, Ag, Ba, Ca, Hg, Pd, Pt, Te, Zn and La. Further, the negative electrode active material may comprise amorphous silicon within the range where the effect of the present invention can be obtained. The particle diameter (median diameter) of these other negative electrode active materials is preferably 1.5 μm or less. In one aspect of the present embodiment, the negative electrode active material preferably comprises SiO, and the median diameter of SiO is not particularly limited but is preferably about 0.5 to 9 μm. The content of these other negative electrode active materials is not particularly limited, but it is preferably 10% by weight or less, more preferably 5% by weight or less, and may be 0% by weight, based on the total amount of negative electrode active materials.

Further, as another negative electrode active material, metals other than silicon and metal oxides may also be exemplified. Examples of the metal include Li, B, Al, Ti, Pb, Sn, In, Bi, Ag, Ba, Ca, Hg, Pd, Pt, Te, Zn, La and an alloy of two or more thereof. In addition, these metals or alloys may comprise one or more non-metallic elements. Examples of the metal oxide may include aluminum oxide, tin oxide, indium oxide, zinc oxide, lithium oxide, or a composite thereof. In addition, one or more elements selected from nitrogen, boron and sulfur may be added to the metal oxide, in an amount of, for example, 0.1 to 5% by weight. This makes it possible to improve the electric conductivity of the metal oxide in some cases.

The negative electrode active material may comprise carbon materials other than graphite as long as the effect of the present invention is not impaired. Examples of the carbon material include amorphous carbon, graphene, diamond-like carbon, carbon nanotube, or a composite thereof. When amorphous carbon having low crystallinity is contained, the volume expansion is relatively small, so that the effect of reducing the volume expansion of the entire negative electrode is high, and deterioration due to non-uniformity such as crystal grain boundaries and defects may hardly occurs in some cases.

The other negative electrode active material(s) may comprise one type alone or two or more types.

(Negative Electrode Binder)

The negative electrode binder is not particularly limited, but examples thereof include polyacrylic acid, styrene butadiene rubber (SBR), polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like may be used, and one type may be used alone, or two or more types may be used in combination. In addition, thickeners such as carboxymethyl cellulose (CMC) may be used in combination. Among these, from the viewpoint of excellent binding property, it is preferable to comprise at least one selected from the group consisting of a combination of SBR and CMC, polyacrylic acid and polyimide, and more preferable to comprise polyacrylic acid.

The content of the negative electrode binder is not particularly limited, but from the viewpoint of "sufficient binding property" and "high energy production" being in a trade-off relation with each other, it is preferably 0.1% by mass or more, more preferably 0.5% by mass or more, further preferably 1% by mass or more, and the upper limit is preferably 20% by mass or less, more preferably 15% by mass or less.

Hereinafter, as one aspect of the present embodiment, polyacrylic acid as a negative electrode binder will be described in detail, but the present invention is not limited thereto.

Polyacrylic acid as a negative electrode binder comprises a monomer unit based on an ethylenically unsaturated carboxylic acid. Examples of the ethylenically unsaturated carboxylic acid include acrylic acid, methacrylic acid, crotonic acid, maleic acid, fumaric acid and itaconic acid, and one type or two or more types may be used. The content of the monomer unit based on the ethylenically unsaturated carboxylic acid in the polyacrylic acid is preferably 50% by mass or more.

In the polyacrylic acid, all or a part of the carboxylic acid groups contained in the monomer units based on the ethylenically unsaturated carboxylic acid may be carboxylic acid salt group(s), which can improve the binding strength in some cases. Examples of the carboxylic acid salt include an alkali metal salts. Examples of the alkali metal constituting the salt include lithium, sodium and potassium, and sodium and potassium are particularly preferable. When the polyacrylic acid comprises a monomer unit based on an alkali metal salt of an ethylenically unsaturated carboxylic acid, the amount of the alkali metal contained in the polyacrylic acid is preferably 5,000 ppm by mass or more of polyacrylic acid, and the upper limit is not particularly limited, but for example, 100,000 ppm by mass or less is preferable. As alkali metals constituting the carboxylic acid salts, plural kinds of alkali metals may be contained. In one aspect of the present embodiment, it is preferred that sodium is present in the polyacrylic acid in an amount of 5000 ppm by mass or more of the polyacrylic acid and/or potassium is present in the polyacrylic acid in an amount of 1 ppm by mass or more and 5 ppm by mass or less of the polyacrylic acid. When the electrode are prepared, the presence of the monomer unit based on the alkali metal salt of ethylenically unsaturated carboxylic acid in the polyacrylic acid can improve the binding property between the active materials and also improve peeling strength between the electrode material mixture layer and the current collector. Thus, it is presumed that it is possible to suppress destruction or the like of the binding structure between the active material particles which is caused by expansion and shrinkage of the active materials, and thus the cycle characteristics of the battery can be improved.

The polyacrylic acid is preferably a copolymer. In one aspect of the present embodiment, it is preferred that the polyacrylic acid comprises a monomer unit based on an ethylenically unsaturated carboxylic acid ester and/or a monomer unit based on an aromatic vinyl compound in addition to the monomer unit based on an ethylenically unsaturated carboxylic acid. When the polyacrylic acid comprises these monomer units, the peeling strength between the electrode mixture layer and the current collector can be improved, and therefore, the cycle characteristics of the battery can be improved.

Examples of the ethylenically unsaturated carboxylic acid ester include acrylic acid ester, methacrylic acid ester, crotonic acid ester, maleic acid ester, fumaric acid ester and itaconic acid ester. Particularly alkyl esters are preferable. The content of the monomer unit based on the ethylenically unsaturated carboxylic acid ester in the polyacrylic acid is preferably 10% by mass or more and 20% by mass or less.

Examples of the aromatic vinyl compound include styrene, α-methylstyrene, vinyltoluene and divinylbenzene, and one kind or two or more kinds may be used. The content of the monomer unit based on the aromatic vinyl compound in the polyacrylic acid is preferably 5% by mass or less.

The polyacrylic acid may comprise other monomer units. Examples of other monomer units include monomer units based on the compounds such as acrylonitrile and conjugated dienes.

The molecular weight of the polyacrylic acid is not particularly limited, but the weight-average molecular weight is preferably 1000 or more, more preferably in the range of 10,000 to 5,000,000, and particularly preferably in the range of 300,000 to 350,000. When the weight-average molecular weight is within the above range, good dispersibility of the active material and the conductive assistant agent can be maintained and excessive increase in slurry viscosity can be suppressed.

In one aspect of the present embodiment, the content of polyacrylic acid relative to the total amount of the negative electrode binder is preferably 50% by weight or more, more preferably 70% by weight or more, and further preferably 80% by weight or more, and it may be 100% by weight. In general, an active material having a large specific surface area requires a large amount of a binder, but the polyacrylic acid has high binding ability even in a small amount. Therefore, when the polyacrylic acid is used as the negative electrode binder, the increase in resistance due to the binder is small even for the electrode comprising an active material having a large specific surface area. In addition, the binder comprising the polyacrylic acid is excellent in reducing the irreversible capacity of the battery, increasing the capacity of the battery and improving the cycle characteristics.

For the purpose of lowering the impedance, the negative electrode may additionally comprise a conductive assistant agent. Examples of the additional conductive assistant agent include flake-like or fibrous carbonaceous fine particles, for example, carbon black, acetylene black, Ketjen black, vapor grown carbon fiber, and the like.

As the negative electrode collector, in view of electrochemical stability, aluminum (limited to the case of using a negative electrode active material having a high negative electrode potential), nickel, copper, silver and alloys thereof are preferable. The shape thereof may be in the form of foil, flat-plate or mesh.

The negative electrode may be produced according to a usual method. In one embodiment, first, graphite particles and crystalline silicon having a median diameter of 0.7 μm or less as a negative electrode active material, a negative electrode binder, and as an optional component, a conductive assistant agent are mixed in a solvent, preferably mixed with a V type mixer (V blender), mechanical milling or the like in a stepwise manner to prepare a slurry. Subsequently, the prepared slurry is applied to a negative electrode current collector and dried to prepare a negative electrode. Applying may be carried out by a doctor blade method, a die coater method, a CVD method, a sputtering method or the like.

[Positive Electrode]

The positive electrode may have a structure in which a positive electrode active material layer comprising a positive electrode active material is formed on a current collector. The positive electrode of the present embodiment has, for example, a positive electrode current collector formed of a metal foil and a positive electrode active material layer formed on one surface or both surfaces of the positive electrode current collector. The positive electrode active material layer is formed so as to cover the positive electrode current collector by the positive electrode binder. The positive electrode current collector is arranged to have an extended portion connected to a positive electrode terminal, and the positive electrode active material layer is not formed on this extended portion.

The positive electrode active material in the present embodiment is not particularly limited as long as it is a material capable of absorbing and desorbing lithium, and it may be selected from some view points. From the viewpoint of high energy density, a compound having high capacity is preferably contained. Examples of the high capacity compound include lithium nickelate ($LiNiO_2$), or lithium nickel composite oxides in which a part of the Ni of lithium nickelate is replaced by another metal element, and layered lithium nickel composite oxides represented by the following formula (A) are preferred.

$$Li_yNi_{(1-x)}M_xO_2 \qquad (A)$$

wherein $0 \leq x < 1$, $0 < y \leq 1.2$, and M is at least one element selected from the group consisting of Co, Al, Mn, Mg, Fe, Ti, and B.

From the viewpoint of high capacity, it is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\beta+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0 < x < 2$), $Li_2MnO_3$, and $Li_xMn_{1.5}Ni_{0.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having olivine structure such as $LiMPO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode binder is not particularly limited, but examples thereof include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polyacrylic acid and the like. In addition to the above, styrene-butadiene rubber (SBR) and the like may be exemplified. When an aqueous binder such as an SBR emulsion is used, a thickener such as carboxymethyl cellulose (CMC) may be used in combination. The positive electrode binders may be mixed and used. The amount of the positive electrode binder to be used is preferably 2 to 10 parts by mass based on 100 parts by mass of the positive electrode active material from the viewpoint of t "sufficient binding property" and "high energy production" being in a trade-off relation with each other.

To the coating layer comprising the positive electrode active material, an electrical conductive assistant agent may be added for the purpose of reducing the impedance. Examples of the conductive assistant agent include flake-like or fibrous carbonaceous fine particles, such as graphite, carbon black, acetylene black and vapor grown carbon fiber.

As the positive electrode current collector, from the viewpoint of electrochemical stability, aluminum, nickel, copper, silver, and alloys thereof are preferable. The shape thereof may be in the form of foil, flat-plate or mesh. In particular, a current collector using aluminum, an aluminum alloy, or iron-nickel-chromium-molybdenum-based stainless steel are preferable.

The positive electrode may be prepared by forming a positive electrode mixture layer comprising a positive electrode active material and a positive electrode binder on a positive electrode current collector. Examples of a method for forming the positive electrode mixture layer include a doctor blade method, a die coater method, a CVD method, a sputtering method, and the like. After forming the positive electrode mixture layer in advance, a thin film of aluminum, nickel or an alloy thereof may be formed by a method such as vapor deposition, sputtering or the like to obtain a positive electrode current collector.

[Electrolyte Solution]

The electrolyte solution is not particularly limited, but for example, a solution in which a supporting salt is dissolved in a nonaqueous solvent may be used.

As the solvent for the electrolyte solution, a nonaqueous solvent that is stable at the operating potential of the battery is preferable. Examples of the non-aqueous solvent include aprotic organic solvents including cyclic carbonates such as propylene carbonate (PC), ethylene carbonate (EC), fluoroethylene carbonate (FEC) and butylene carbonate (BC); open-chain carbonates such as dimethyl carbonate (DMC), diethyl carbonate (DEC), ethyl methyl carbonate (EMC) and dipropyl carbonate (DPC); propylene carbonate derivatives; aliphatic carboxylic acid esters such as methyl formate, methyl acetate and ethyl propionate; ethers such as diethyl ether and ethyl propyl ether; and fluorinated aprotic organic solvents in which at least a part of the hydrogen atoms of these compounds is(are) substituted with fluorine atoms.

Among these, cyclic or open-chain carbonates such as ethylene carbonate (EC), propylene carbonate (PC), butylene carbonate (BC), dimethyl carbonate (DMC), diethyl carbonate (DEC), ethyl methyl carbonate (MEC) and dipropyl carbonate (DPC) are preferably comprised.

The non-aqueous solvent may be used alone, or two or more types may be used in combination.

The examples of lithium salts include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. Supporting salts may be used alone or in combination of two or more. From the viewpoint of cost reduction, $LiPF_6$ is preferable.

The electrolyte solution may further comprise other additives and is not particularly limited, but examples thereof include unsaturated carboxylic acid anhydride, unsaturated cyclic carbonate, cyclic or open-chain disulfonic acid ester, and the like. By adding these compounds, the cycle characteristics of the battery can be further improved. This is presumably because these additives decompose during charge and discharge of the secondary battery to form a film on the surface of the electrode active material and suppress decomposition of the electrolyte solution and the supporting salt.

The unsaturated carboxylic acid anhydride is a carboxylic acid anhydride having at least one carbon-carbon unsaturated bond in the molecule. Cyclic unsaturated carboxylic acid anhydrides are particularly preferred. Examples of the unsaturated carboxylic acid anhydride include maleic anhydride and derivatives thereof such as maleic anhydride, methyl maleic anhydride, ethyl maleic anhydride, 3,4-dimethyl maleic anhydride and 3,4-diethyl maleic anhydride; and succinic acid derivatives such as itaconic anhydride, vinyl succinic anhydride and the like.

The content of the unsaturated carboxylic acid anhydride in the electrolyte solution is not particularly limited, but it is preferably 0.01% by mass or more to 10% by mass or less. When the content is 0.01% by mass or more, a sufficient film forming effect can be obtained. When the content is 10% by mass or less, gas generation due to decomposition of the unsaturated carboxylic acid anhydride itself can be suppressed.

The unsaturated cyclic carbonate is a cyclic carbonate having at least one carbon-carbon unsaturated bond in the molecule. Examples of the unsaturated cyclic carbonate include vinylene carbonate compounds such as vinylene carbonate, methyl vinylene carbonate, ethyl vinylene carbonate, 4,5-dimethyl vinylene carbonate, 4,5-diethyl vinylene carbonate and the like; vinyl ethylene carbonate compounds such as 4-vinyl ethylene carbonate, 4-methyl-4-vinyl ethylene carbonate, 4-ethyl-4-vinyl ethylene carbonate, 4-n-propyl-4-vinylene ethylene carbonate, 5-methyl-4-vinylethylene carbonate, 4,4-divinyl ethylene carbonate, 4,5-divinyl ethylene carbonate, 4,4-dimethyl-5-methylene ethylene carbonate and 4,4-diethyl-5-methylene ethylene carbonate.

The content of the unsaturated cyclic carbonate in the electrolyte solution is not particularly limited, but it is preferably 0.01% by mass or more and 10% by mass or less. When the content is 0.01% by mass or more, a sufficient film forming effect can be obtained. When the content is 10% by mass or less, gas generation due to decomposition of the unsaturated cyclic carbonate itself can be suppressed.

As the cyclic or open-chain disulfonic acid esters, for example, cyclic disulfonic acid esters represented by the following formula (C) or open-chain disulfonic acid esters represented by the following formula (D) can be exemplified.

(C)

In formula (C), $R_1$ and $R_2$, each independently represent a substituent selected from the group consisting of a hydrogen atom, an alkyl group having 1 to 5 carbon atoms, a halogen group, and an amino group. $R_3$ represents an alkylene group having 1 to 5 carbon atoms, a carbonyl group, a sulfonyl group, a fluoroalkylene group having 1 to 6 carbon atoms, or a divalent group having 2 to 6 carbon atoms in which alkylene units or fluoroalkylene units are bonded via ether group.

In formula (C), $R_1$ and $R_2$ are each independently preferably a hydrogen atom, an alkyl group having 1 to 3 carbon atoms or a halogen group, and $R_3$ is more preferably an alkylene group or fluoroalkylene group having 1 or 2 carbon atoms.

Preferable examples of the cyclic disulfonic acid esters represented by the formula (C) include compounds represented by the following formulae (1) to (20).

(1)

(2)

(3)

(4)

(5)

(6)

-continued

(7)

(8)

(9)

(10)

(11)

(12)

(13)

(14)

(15)

(16)

(17)

(18)

(19)

(20)

(D)

In formula (D), $R^4$ and $R^7$ each independently represent an atom or a group selected from the group consisting of a hydrogen atom, an alkyl group having 1 to 5 carbon atoms, an alkoxy group having 1 to 5 carbon atoms, an fluoroalkyl group having 1 to 5 carbon atoms, an polyfluoroalkyl group having 1 to 6 carbon atoms, —$SO_2X_3$ ($X_3$ is an alkyl group having 1 to 5 carbon atoms), —$SY_1$ ($Y_1$ is an alkyl group having 1 to 5 carbon atoms), —COZ (Z is a hydrogen atom or an alkyl group having 1 to 5 carbon atoms), and a halogen atom. $R^5$ and $R^6$ each independently represent an atom or a group selected from an alkyl group having 1 to 5 carbon atoms, an alkoxy group having 1 to 5 carbon atoms, a phenoxy group, a fluoroalkyl group having 1 to 5 carbon atoms, a polyfluoroalkyl group having 1 to 5 carbon atoms, a fluoroalkoxy group having 1 to 5 carbon atoms, a polyfluoroalkoxy group having 1 to 5 carbon atoms, a hydroxyl group, a halogen atom, —$NX_4X_5$ ($X_4$ and $X_5$ are each independently a hydrogen or an alkyl group having 1 to 5 carbon atoms) and —$NY_2CONY_3Y_4$($Y_2$ to $Y_4$ are each independently a hydrogen atom or an alkyl group having 1 to 5 carbon atoms).

In the formula (D), $R^4$ and $R^7$ are, independently each other, preferably a hydrogen atom, an alkyl group having 1 or 2 carbon atoms, a fluoroalkyl group having 1 or 2 carbon atoms, or a halogen atom, and $R^5$ and $R^6$, independently each other, represent an alkyl group having 1 to 3 carbon atoms, an alkoxy group having 1 to 3 carbon atoms, a fluoroalkyl group having 1 to 3 carbon atoms, a polyfluoroalkyl group having 1 to 3 carbon atoms, a hydroxyl group or a halogen atom.

Preferred compounds of the open-chain disulfonic acid ester compound represented by the formula (D) include, for example, the following compounds.

The content of the cyclic or open-chain disulfonic acid ester in the electrolyte solution is preferably 0.01% by mass or more and 10% by mass or less. When the content is 0.01% by mass or more, a sufficient film effect can be obtained. When the content is 10% by mass or less, an increase in the viscosity of the electrolyte solution and an increase in resistance associated therewith can be suppressed.

[Separator]

The separator may be of any type as long as it suppresses electric conduction between the positive electrode and the negative electrode, does not inhibit the permeation of charged substances, and has durability against the electrolyte solution. Specific examples of the material include polyolefins such as polypropylene and polyethylene; cellulose, polyethylene terephthalate, polyimide, polyvinylidene fluoride; and aromatic polyamides (aramid) such as polymetaphenylene isophthalamide, polyparaphenylene terephthalamide and copolyparaphenylene 3,4'-oxydiphenylene terephthalamide; and the like. These can be used as porous films, woven fabrics, nonwoven fabrics and the like.

[Insulation Layer]

An insulation layer may be formed on at least one surface of the positive electrode, the negative electrode and the separator. Examples of a method for forming the insulation layer include a doctor blade method, a dip coating method, a die coater method, a CVD method, a sputtering method and the like. An insulation layer may be formed at the same time as forming the positive electrode, the negative electrode, or the separator. Examples of materials constituting the insulation layer include a mixture of aluminum oxide, barium titanate or the like and SBR or PVDF.

[Structure of Lithium Ion Secondary Battery]

Figure 1:
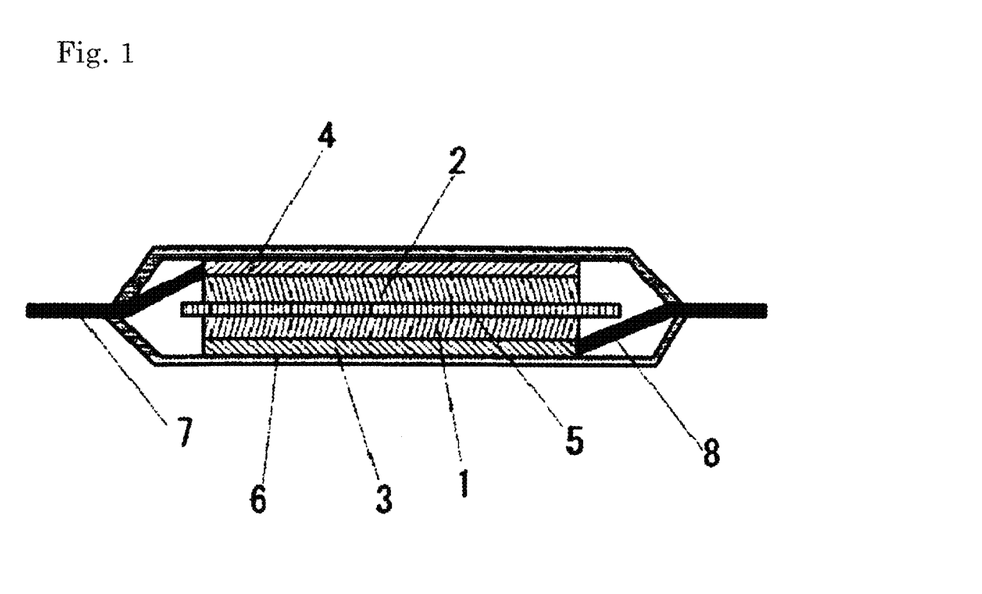
FIG. 1 is a sectional view of a lithium ion secondary battery according to one embodiment of the present invention.
Figure 2:
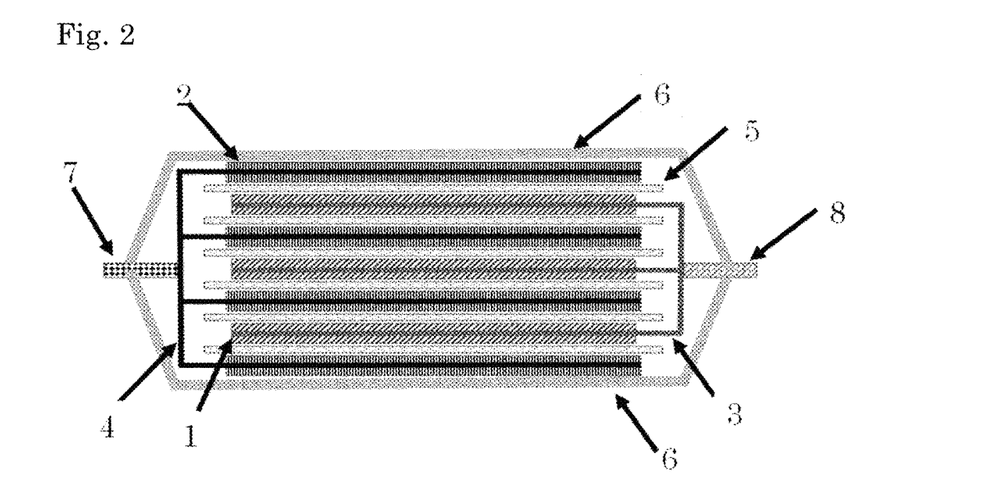
FIG. 2 is a schematic sectional view showing a structure of a stacking laminate type of a secondary battery according to one embodiment of the present invention.

FIG. 1 shows a laminate-type secondary battery as an example of a secondary battery according to the present embodiment. The separator 5 is sandwiched between a positive electrode comprising a positive electrode active material layer 1 containing a positive electrode active material and a positive electrode current collector 3 and a negative electrode comprising a negative electrode active material layer 2 and a negative electrode current collector 4. The positive electrode current collector 3 is connected to the positive electrode lead terminal 8 and the negative electrode current collector 4 is connected to the negative electrode lead terminal 7. The exterior laminate 6 is used for the outer package, and the interior of the secondary battery is filled with an electrolyte solution. The electrode element (also referred to as "battery element" or "electrode laminate") preferably has a structure in which a plurality of positive electrodes and a plurality of negative electrodes are stacked via separators, as shown in FIG. 2.

Figure 3:
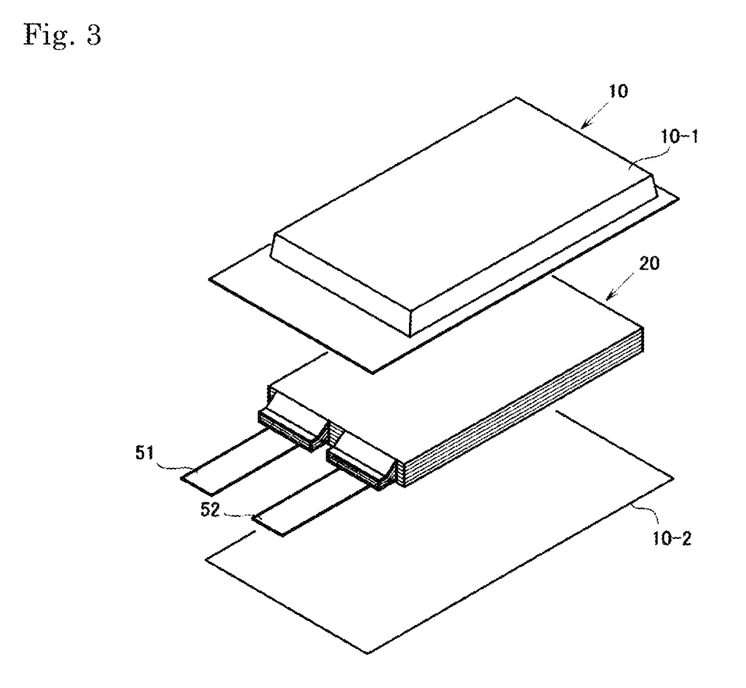
FIG. 3 is an exploded perspective view showing a basic structure of a film-packaged battery.
Figure 4:
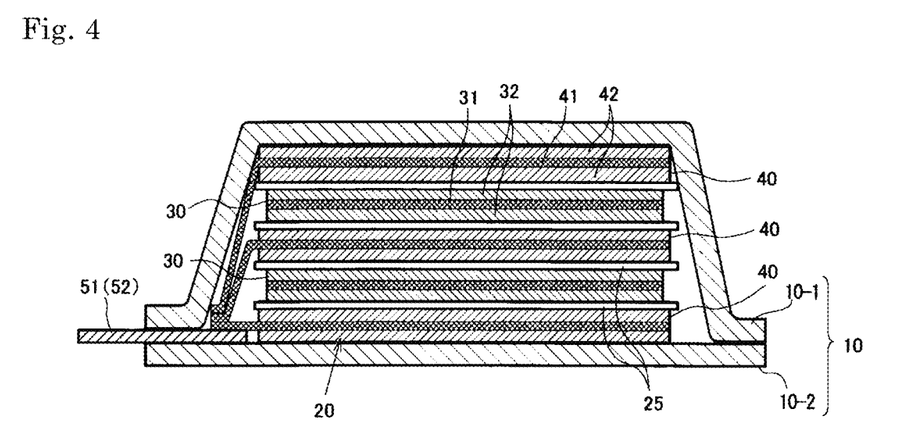
FIG. 4 is a cross-sectional view schematically showing a cross-section of the battery in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

[Method for Manufacturing Lithium Ion Secondary Battery]

The lithium ion secondary battery according to the present embodiment can be manufactured according to a conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form the electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

[Assembled Battery]

A plurality of lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

[Vehicle]

The lithium ion secondary battery or the assembled battery according to the present embodiment can be used in vehicles. Examples of the vehicle according to an embodiment of the present invention include hybrid vehicles, fuel cell vehicles, electric vehicles (besides four-wheel vehicles (cars, trucks, commercial vehicles such as buses, light automobiles, etc.), two-wheeled vehicle (bike) and tricycle), and the like. The vehicles according to the present embodiment is not limited to automobiles, it may be a variety of power source of other vehicles, such as a moving body like a train.

EXAMPLES

Hereinafter, an embodiment of the present invention will be explained in details with reference to examples, but the present invention is not limited to these examples.

Example 1

Preparation of the battery of the present examples will be described.

(Positive Electrode)

A lithium nickel composite oxide ($LiNi_{0.80}Mn_{0.15}Co_{0.05}O_2$) as a positive electrode active material, carbon black as a conductive assistant agent and polyvinylidene fluoride as a binder were weighed at a mass ratio of 90:5:5 and they were kneaded using N-methylpyrrolidone to prepare a positive electrode slurry. The prepared positive electrode slurry was applied to one surface of aluminum foil having a thickness of 20 μm and dried, and further pressed to prepare a positive electrode. The coating amount on the aluminum foil for the positive electrode was adjusted so that the ratio of the opposing negative electrode capacity/the positive electrode capacity per unit area was 1.20.

(Negative Electrode)

Artificial graphite particles (median diameter: 1.5 μm, d (002) value: 0.336 nm, G/D ratio≥9) as a carbon material (a) and crystalline silicon particles (median diameter: 0.7 μm, crystallite size: 100 nm) were mixed such that 100×[crystalline silicon particles/(artificial graphite particles+crystalline silicon particles)] was 25 wt % to prepare a negative electrode active material. The prepared active material, carbon black as a conductive assistant agent, polyacrylic acid-based polymer as a binder (manufactured by Sumitomo Seika Chemicals Co., Ltd.) were weighed at a mass ratio of 95:1:4 and kneaded with distilled water to prepare a negative electrode slurry. The prepared negative electrode slurry was applied to one surface of a copper foil having a thickness of 15 μm as a current collector with a coating weight of 10 mg/cm$^2$ and dried, and further pressed to obtain a negative electrode. When this negative electrode is used, the 1 C current value is 77 mAh.

The negative electrode capacity was calculated as follows. When the electrode area was 30 mm×28 mm and the negative electrode active material was applied to one surface at 10 mg/cm$^2$, the initial charge capacity was 92 mAh. The negative electrode active material capacity is $$372(mAh/g) \times 75/100 + 3500(mAh/g) \times 25/100 = 1154 \text{ (mAh/g)}.$$

Therefore, the negative electrode capacity is $$1154 \times 0.95 \times 10/1000 \times 3 \times 2.8 = 92 \text{(mAh)}.$$

(Separator)

As a separator, a PP aramid composite separator in which a microporous film made of PP (polypropylene) having a thickness of 20 μm and an aramid non-woven fabric film having a thickness of 20 μm were laminated and subjected to heat roll pressing at 130° C. was used.

(Electrode Element)

One single-surface positive electrode and one single-surface negative electrode were stacked with a separator interposed therebetween (single cell initial charge capacity was 92 mAh). End portion of a positive electrode current collector which is not covered with a positive electrode active material and end portion of a negative electrode current collector which is not covered with a negative electrode active material are respectively welded, and a positive electrode terminal made of aluminum and a negative electrode terminal made of nickel were respectively attached by welding to the welded portions to obtain an electrode element having a planar laminated structure.

(Electrolyte Solution)

In a mixed solvent of EC (ethylene carbonate), FEC (fluoroethylene carbonate) and DEC (diethyl carbonate) (volume ratio: EC/FEC/DEC=20/10/70) as a non-aqueous solvent, $LiPF_6$ as a supporting salt was dissolved so as to be 1M in the electrolyte solution, to prepare the electrolyte solution.

(Preparation of Battery)

The above electrode element was wrapped with aluminum laminate film as an outer package and the electrolyte solution was injected within the outer package, and then the outer package was sealed while the pressure was being reduced to 0.1 atm, thereby producing a secondary battery.

[Evaluation of the Secondary Battery]

The prepared secondary battery was charged at 0.1 C current value for 12 hours and then discharged at 1 C. After that, a cycle test was carried out at 45° C. with 1 C charge and 1 C discharge. This charge and discharge was repeated 50 times and the capacity retention ratio after 50 cycles was calculated by the following formula:

$$\{(\text{Discharge capacity after 50 cycles})/(\text{Discharge capacity after one cycle})\} \times 100 \text{ (unit: \%)}.$$

Example 2

A secondary battery was prepared and evaluated in the same manner as in Example 1 except that crystalline silicon particles were mixed so that a ratio of crystalline silicon particles/(artificial graphite particles+crystalline silicon particles) was 10 wt %.

Example 3

A secondary battery was prepared and evaluated in the same manner as in Example 2 except that the negative electrode binder was a polyimide-based polymer (manufactured by Ube Industries, Ltd.).

Example 4

A secondary battery was prepared and evaluated in the same manner as in Example 1 except that crystalline silicon particles were mixed so that a ratio of crystalline silicon particles/(artificial graphite particles+crystalline silicon particles) was 1 wt %.

Example 5

A secondary battery was prepared and evaluated in the same manner as in Example 1 except that crystalline silicon particles, artificial graphite particles and silicon oxide particles (median diameter: 5 μm) were mixed so that a mixing ratio of crystalline silicon particles/artificial graphite particles/silicon oxide was 25/74/1 (wt %).

Example 6

A secondary battery was prepared and evaluated in the same manner as in Example 2 except that the crystalline silicon particles, the artificial graphite particles and silicon oxide particles were mixed so that a mixing ratio of crystalline silicon particles/artificial graphite particles/silicon oxide was 10/89/1 (wt %).

Example 7

A secondary battery was prepared and evaluated in the same manner as in Example 3 except that crystalline silicon particles, artificial graphite particles and silicon oxide particles were mixed so that a mixing ratio of crystalline silicon particles/artificial graphite particles/silicon oxide particles was 10/89/1 (wt %).

Example 8

A secondary battery was prepared and evaluated in the same manner as in Example 4 except that crystalline silicon particles, artificial graphite particles and silicon oxide particles were mixed so that a mixing ratio of crystalline silicon particles/artificial graphite particles/silicon oxide particles was 1/98/1 (wt %).

Example 9

A secondary battery was prepared and evaluated in the same manner as in Example 5 except that the median diameter of the crystalline silicon particles was 0.2 μm (crystallite size: 50 nm) and the median diameter of the artificial graphite particles was 9 μm.

Example 10

A secondary battery was prepared and evaluated in the same manner as in Example 6 except that the median diameter of the crystalline silicon particles was 0.2 μm and the median diameter of the artificial graphite particles was 9 μm.

Example 11

A secondary battery was prepared and evaluated in the same manner as in Example 7 except that the median diameter of the crystalline silicon particles was 0.2 μm and the median diameter of the artificial graphite particles was 9 μm.

Example 12

A secondary battery was prepared and evaluated in the same manner as in Example 8 except that the median diameter of the crystalline silicon particles was 0.2 μm and the median diameter of the artificial graphite particles was 9 μm.

Example 13

A secondary battery was prepared and evaluated in the same manner as in Example 9 except that the median diameter of the crystalline silicon particles was 0.7 μm (crystallite size: 100 nm).

Example 14

A secondary battery was prepared and evaluated in the same manner as in Example 10 except that the median diameter of the crystalline silicon particles was 0.7 μm (crystallite size: 100 nm).

Example 15

A secondary battery was prepared and evaluated in the same manner as in Example 11 except that the median diameter of the crystalline silicon particles was 0.7 μm (crystallite size: 100 nm).

Example 16

A secondary battery was prepared and evaluated in the same manner as in Example 12 except that the median diameter of the crystalline silicon particles was 0.7 μm (crystallite size: 100 nm).

Example 17

A secondary battery was prepared and evaluated in the same manner as in Example 13 except that the median diameter of the artificial graphite particles was 2 μm.

Example 18

A secondary battery was prepared and evaluated in the same manner as in Example 14 except that the median diameter of the artificial graphite particles was 2 μm.

Example 19

A secondary battery was prepared and evaluated in the same manner as in Example 15 except that the median diameter of the artificial graphite particles was 2 μm.

Example 20

A secondary battery was prepared and evaluated in the same manner as in Example 16 except that the median diameter of the artificial graphite particles was 2 μm.

Example 21

A secondary battery was prepared and evaluated in the same manner as in Example 14 except that the median diameter of the crystalline silicon particles was 0.5 μm.

Example 22

A secondary battery was prepared and evaluated in the same manner as in Example 14 except that the median diameter of the crystalline silicon particles was 0.3 μm.

Example 23

A secondary battery was prepared and evaluated in the same manner as in Example 14 except that the median diameter of the crystalline silicon particles was 0.1 μm (crystallite size: 50 nm) and the median diameter of the artificial graphite particles was 2 μm.

Example 24

A secondary battery was prepared and evaluated in the same manner as in Example 21 except that the negative electrode binder was a mixture of a polyacrylic acid-based polymer and SBR (styrene butadiene rubber) (a weight ratio of 4:1). The SBR of the negative electrode binder was synthesized as follows. An aqueous solution prepared by dissolving 5 parts by weight of sodium dodecylbenzenesulfonate as an emulsion polymerization agent, 75 parts by weight of butadiene and 25 parts by weight of styrene as raw material monomers, and a redox catalyst were charged in an autoclave and the temperature was adjusted to 10° C., and then 0.01 parts by weight of cumene hydroxide as a polymerization initiator was added, and emulsion polymerization was carried out up to a polymerization conversion of 85%. Then, after adding the reaction terminator of N, N-diethylhydroxylamine, it was purified and a copolymer emulsion was synthesized. This was used as SBR.

Example 25

A secondary battery was prepared and evaluated in the same manner as in Example 21 except that the negative electrode binder was a copolymer of an ethylenically unsaturated carboxylic acid, an alkali metal salt monomer of an ethylenically unsaturated carboxylic acid, styrene and butadiene. The copolymer was synthesized as follows. An aqueous solution prepared by dissolving 5 parts by weight of sodium dodecylbenzenesulfonate as an emulsion polymerization agent, 50 parts of butadiene, 25 parts by weight of styrene and 25 parts by weight of acrylic acid as raw material monomers and a redox catalyst were charged in an autoclave and the temperature was adjusted to 10° C., and then 0.01 part by weight of cumene hydrooxide as a polymerization initiator was added, and emulsion polymerization was carried out up to a polymerization conversion of 85%. Then, after the reaction terminator of N, N-diethylhydroxylamine was added and the carboxylic acid was substituted with sodium using sodium hydroxide, it was purified to synthesize a copolymer emulsion. This was used as a negative electrode binder.

Example 26

A secondary battery was prepared and evaluated in the same manner as in Example 15 except that the solvent for preparing a negative electrode slurry was changed to NMP (n-methylpyrrolidone) in order to change the polyimide-based polymer to a NMP-based varnish polyimide-based material (manufactured by Ube Industries, Ltd.).

Example 27

A secondary battery was prepared and evaluated in the same manner as in Example 26 except that the median diameter of the crystalline silicon particles was 0.5 μm.

Comparative Example 1

A secondary battery was prepared and evaluated in the same manner as in Example 14 except that the median diameter of the crystalline silicon particles was 1 μm.

Comparative Example 2

A secondary battery was prepared and evaluated in the same manner as in Example 14 except that crystalline silicon particles, artificial graphite particles and silicon oxide particles were mixed so that a mixing ratio of crystalline silicon particles/artificial graphite particles/silicon oxide particles was 30/69/1 (wt %).

Reference Example 3

A secondary battery was prepared and evaluated in the same manner as in Example 14 except that the median diameter of the crystalline silicon particles was 0.1 μm.

Comparative Example 4

A secondary battery was prepared and evaluated in the same manner as in Example 14 except that the crystalline silicon particles were changed to amorphous silicon particles. The secondary battery manufactured in this Comparative Example had deviations in detected voltage and discharge capacity could not be measured.

Characteristics of the negative electrode, evaluation results of the secondary battery and the like in each Example and Comparative Example are shown in Table 1.

Figure 7:
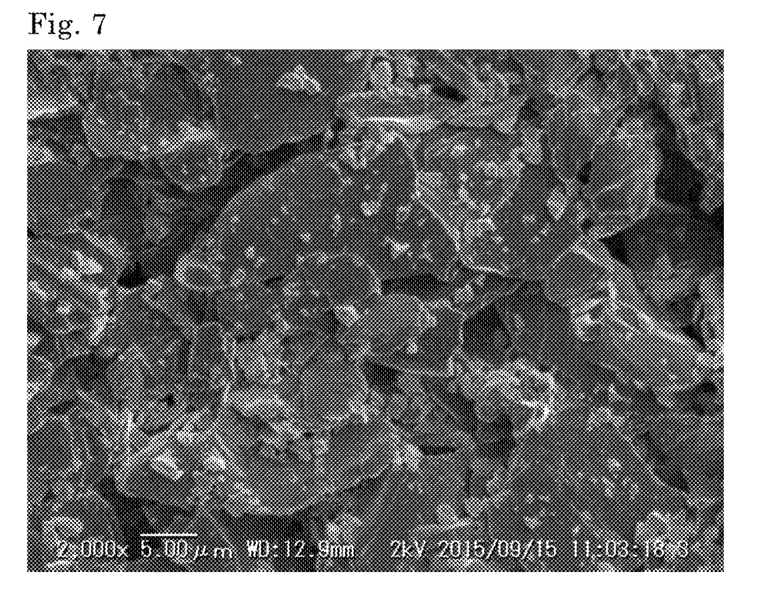
FIG. 7 is a SEM image of the negative electrode produced in Comparative Example 1.

SEM images of the negative electrodes of Examples 22 and 21 and Comparative Example 1 are shown in FIGS. 5, 6 and 7, respectively. In the negative electrodes of Examples 22 and 21, silicon particles were evenly adhered to the surface of graphite particles as compared with the negative electrode of Comparative Example 1.

Figure 8:
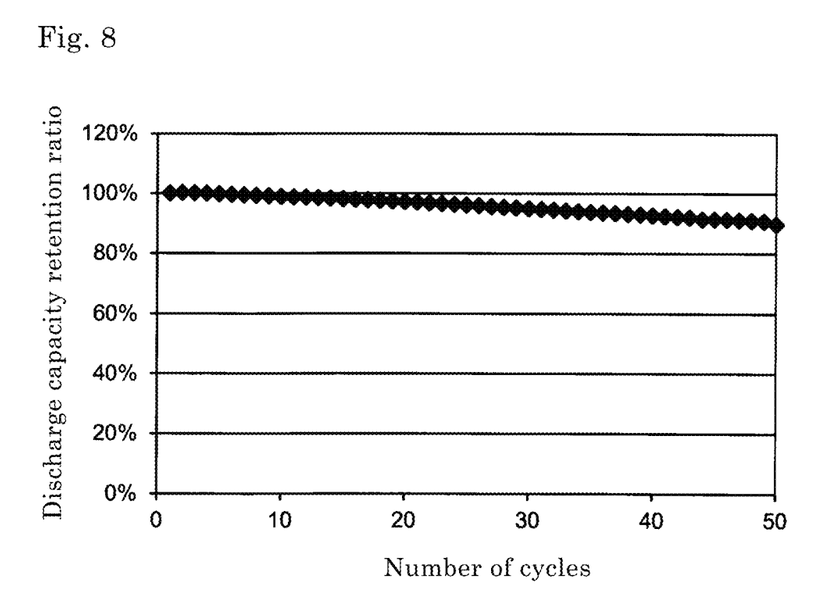
FIG. 8 is a graph showing the relationship between the number of cycles and the capacity retention ratio of the lithium ion secondary battery of Example 21.

The discharge capacity retention ratio (%) for each cycle of the secondary battery manufactured in Example 21 is shown in FIG. 8.

TABLE 1

| | particle diameter of Si (X) | Si/(Si + graphite) | Si oxide/(Si + graphite + Si oxide) | particle diameter of graphite (Y) | particle diameter ratio (100 × X/Y) | crystallinity of Si, crystallite size unit | negative electrode binder | capacity retention ratio after 50 cycles | negative electrode capacity | 1 C current value |
|---|---|---|---|---|---|---|---|---|---|---|
| | μm | wt % | wt % | μm | (%) | (nm) | PAA | % | mAh | mA |
| Ex. 1 | 0.7 | 25 | 0 | 1.5 | 46.67 | crystalline 100 nm | PAA | 75 | 92 | 77 |
| Ex. 2 | 0.7 | 10 | 0 | 1.5 | 46.67 | crystalline 100 nm | PAA | 79 | 55 | 46 |
| Ex. 3 | 0.7 | 10 | 0 | 1.5 | 46.67 | crystalline 100 nm | PI | 80 | 55 | 46 |
| Ex. 4 | 0.7 | 1 | 0 | 1.5 | 46.67 | crystalline 100 nm | PAA | 76 | 32 | 27 |
| Ex. 5 | 0.7 | 25 | 1 | 1.5 | 46.67 | crystalline 100 nm | PAA | 74 | 92 | 77 |
| Ex. 6 | 0.7 | 10 | 1 | 1.5 | 46.67 | crystalline 100 nm | PAA | 78 | 55 | 46 |
| Ex. 7 | 0.7 | 10 | 1 | 1.5 | 46.67 | crystalline 100 nm | PI | 78 | 55 | 46 |
| Ex. 8 | 0.7 | 1 | 1 | 1.5 | 46.67 | crystalline 100 nm | PAA | 75 | 32 | 27 |
| Ex. 9 | 0.2 | 25 | 1 | 9 | 2.22 | crystalline 50 nm | PAA | 77 | 92 | 77 |
| Ex. 10 | 0.2 | 10 | 1 | 9 | 2.22 | crystalline 50 nm | PAA | 80 | 55 | 46 |
| Ex. 11 | 0.2 | 10 | 1 | 9 | 2.22 | crystalline 50 nm | PI | 80 | 55 | 46 |
| Ex. 12 | 0.2 | 1 | 1 | 9 | 2.22 | crystalline 50 nm | PAA | 81 | 32 | 27 |
| Ex. 13 | 0.7 | 25 | 1 | 9 | 7.78 | crystalline 100 nm | PAA | 85 | 92 | 77 |
| Ex. 14 | 0.7 | 10 | 1 | 9 | 7.78 | crystalline 100 nm | PAA | 88 | 55 | 46 |
| Ex. 15 | 0.7 | 10 | 1 | 9 | 7.78 | crystalline 100 nm | PI | 89 | 55 | 46 |
| Ex. 16 | 0.7 | 1 | 1 | 9 | 7.78 | crystalline 100 nm | PAA | 88 | 32 | 27 |
| Ex. 17 | 0.7 | 25 | 1 | 2 | 35.00 | crystalline 100 nm | PAA | 73 | 92 | 77 |
| Ex. 18 | 0.7 | 10 | 1 | 2 | 35.00 | crystalline 100 nm | PAA | 76 | 55 | 46 |
| Ex. 19 | 0.7 | 10 | 1 | 2 | 35.00 | crystalline 100 nm | PI | 75 | 55 | 46 |
| Ex. 20 | 0.7 | 1 | 1 | 2 | 35.00 | crystalline 100 nm | PAA | 73 | 32 | 27 |
| Ex. 21 | 0.5 | 10 | 1 | 9 | 5.56 | crystalline 100 nm | PAA | 89 | 55 | 46 |
| Ex. 22 | 0.3 | 10 | 1 | 9 | 3.33 | crystalline 100 nm | PAA | 90 | 55 | 46 |
| Ex. 23 | 0.1 | 10 | 1 | 2 | 5.00 | crystalline 50 nm | PAA | 79 | 55 | 46 |
| Ex. 24 | 0.5 | 10 | 1 | 9 | 5.56 | crystalline 100 nm | M-P | 89 | 55 | 46 |
| Ex. 25 | 0.5 | 10 | 1 | 9 | 5.56 | crystalline 100 nm | C-P | 90 | 55 | 46 |
| Ex. 26 | 0.7 | 10 | 1 | 9 | 7.78 | crystalline 100 nm | N-PI | 88 | 55 | 46 |
| Ex. 27 | 0.5 | 10 | 1 | 9 | 5.56 | crystalline 100 nm | N-PI | 89 | 55 | 46 |
| Com. Ex. 1 | 1 | 10 | 1 | 9 | 11.11 | crystalline 100 nm | PAA | 54 | 55 | 46 |
| Com. Ex. 2 | 0.7 | 30 | 1 | 9 | 7.78 | crystalline 100 nm | PAA | 34 | 105 | 87 |
| Ref. Ex. 3 | 0.1 | 10 | 1 | 9 | 1.11 | crystalline 50 nm | PAA | 48 | 55 | 46 |
| Com. Ex. 4 | 0.7 | 10 | 1 | 9 | 7.78 | amorphous | PAA | deviations in detected voltage | | |

PAA: polyacrylic acid-based polymer
PI: polyimide-based polymer
M-P: mixture of polyacrylic acid and SBR (styrene-butadiene rubber)
C-P: copolymer of an ethylenically unsaturated carboxylic acid, an alkali metal salt monomer of an ethylenically unsaturated carboxylic acid, styrene and butadiene
N-PI: NMP-based polyimide
Ex.: Example
Com. Ex.: Comparative Example
Ref. Ex.: Reference Example As shown in FIG. 5, FIG. 6, and FIG. 7, when the median diameter of the silicon particles was 0.7 μm or less, the silicon particles uniformly and evenly adhered to the surface of the graphite particles. As shown in Table 1, it was found that, by changing the median diameter of crystalline silicon particles, the content of crystalline silicon particles, and the ratio of the median diameters of crystalline silicon particles and graphite particles, the capacity retention ratio changes and there was a correlation between them. Furthermore, it was found that, when a specific binder is used and the mixing ratio and median diameter ratio of the crystalline silicon particles and graphite particles are specific ratios, respectively, particular effect is obtained.

(Manufacturing of a Large Lithium Ion Secondary Battery)

A large cell was prepared in the same manner as in Example 1. Five positive electrodes (electrode coated portion was 125 mm×65 mm) coated on both surfaces and six negative electrodes (electrode coated portion was 130 mm×69 mm) coated on both surfaces were laminated alternately while sandwiching the separators. End portion of a positive electrode current collector which is not covered with a positive electrode active material and end portion of a negative electrode current collector which is not covered with a negative electrode active material are respectively welded, and a positive electrode terminal made of aluminum and a negative electrode terminal made of nickel were respectively attached by welding to the welded portions to obtain an electrode element having a planar laminated structure. Even for the large lithium ion secondary batteries, the similar tendency as in small lithium ion secondary batteries was observed.

This application is based upon and claims the benefit of priority from Japanese Patent Application No. 2016-036538 filed on Feb. 29, 2016 and Japanese Patent Application No. 2016-203416 filed on Oct. 17, 2016, the disclosures of which are incorporated herein in their entirety by reference.

INDUSTRIAL APPLICABILITY

The lithium ion secondary battery according to the present invention can be used, for example, in all industrial fields requiring power supply, and industrial fields related to transportation, storage and supply of electrical energy. Specifically, it can be utilized for, for example, an electric power source of a mobile device such as a mobile phone and a notebook computer; an electric power source of a moving or transport medium including an electric vehicle such as an electric car, a hybrid car, an electric motorcycle and an electric power-assisted bicycle, a train, a satellite and a submarine; a back-up electric power source such as UPS; and an electric power storage device for storing an electric power generated by solar power generation, wind power generation, and the like.

EXPLANATION OF REFERENCE 1 positive electrode active material layer
2 negative electrode active material layer
3 positive electrode current collector
4 negative electrode current collector
5 separator
6 exterior laminate
7 negative electrode lead terminal
8 positive electrode lead terminal
10 film outer package
20 battery element
25 separator
30 positive electrode
40 negative electrode

The invention claimed is:

1. A negative electrode active material comprising graphite particles and crystalline silicon particles, wherein
a median diameter of the crystalline silicon particles is 0.7 μm or less,
a weight ratio of the crystalline silicon particles to the total weight of the graphite particles and the crystalline silicon particles is 10 wt % or more and 25 wt % or less,
a crystallite size of the crystalline silicon particles is 50 nm or more and 200 nm or less, and
X/Y is 2.22/100 or more and 46.67/100 or less, in which X is a median diameter of the crystalline silicon particles and Y is a median diameter of the graphite particles.

2. The negative electrode active material according to claim 1, further comprising silicon oxide.

3. The negative electrode active material according to claim 1, wherein X/Y is 2.22/100 or more and 40/100 or less, in which X is a median diameter of the crystalline silicon particles and Y is a median diameter of the graphite particles.

4. A negative electrode comprising the negative electrode active material according to claim 1.

5. The negative electrode according to claim 4, further comprising a negative electrode binder comprising polyacrylic acid and/or polyimide.

6. The negative electrode according to claim 5, wherein the polyacrylic acid comprises a monomer unit based on an ethylenically unsaturated carboxylic acid and a monomer unit based on an alkali metal salt of an ethylenically unsaturated carboxylic acid and/or a monomer unit based on an aromatic vinyl compound.

7. A lithium ion secondary battery comprising the negative electrode according to claim 4.

8. The negative electrode active material according to claim 1, wherein the crystallite size of the crystalline silicon particles is 70 nm or more and 200 nm or less.

9. The negative electrode active material according to claim 1, wherein X/Y is 3.33/100 or more and 30/100 or less, in which X is a median diameter of the crystalline silicon particles and Y is a median diameter of the graphite particles.

10. The negative electrode active material according to claim 8, wherein X/Y is 3.33/100 or more and 30/100 or less, in which X is a median diameter of the crystalline silicon particles and Y is a median diameter of the graphite particles.

11. The negative electrode according to claim 4, further comprising a negative electrode binder comprising a copolymer of an ethylenically unsaturated carboxylic acid, an alkali metal salt monomer of an ethylenically unsaturated carboxylic acid, styrene, and butadiene.

* * * * *